US009181900B1

(12) United States Patent
Lugg (10) Patent No.: US 9,181,900 B1
(45) Date of Patent: *Nov. 10, 2015

(54) FULLY ADVANCED SUPERCONDUCTING SEGMENTED TURBO-ELECTRIC ROTORMACHINE (FASSTER)

(75) Inventor: Richard H. Lugg, Falmouth, ME (US)

(73) Assignee: Sonic Blue Aerospace, Inc., Portland, ME (US)

(*) Notice: Subject to any disclaimer, the term of this patent is extended or adjusted under 35 U.S.C. 154(b) by 864 days.

This patent is subject to a terminal disclaimer.

(21) Appl. No.: 13/307,954

(22) Filed: Nov. 30, 2011

Related U.S. Application Data (63) Continuation-in-part of application No. 13/059,240, filed as application No. PCT/US2009/054317 on Aug. 19, 2009, now Pat. No. 8,365,510.

(60) Provisional application No. 61/418,166, filed on Nov. 30, 2010, provisional application No. 61/189,365, filed on Aug. 19, 2008, provisional application No. 61/224,666, filed on Jul. 10, 2009.

(51) Int. Cl.
*F02K 5/00* (2006.01)
*F02K 3/02* (2006.01)

(52) U.S. Cl.
CPC .. *F02K 5/00* (2013.01); *F02K 3/025* (2013.01)

(58) Field of Classification Search
USPC ............... 60/39.01, 39.465, 202; 310/11
See application file for complete search history.

(56) References Cited

U.S. PATENT DOCUMENTS

| | | | |
|---|---|---|---|
| 2007/0126292 A1* | 6/2007 | Lugg | 310/11 |
| 2010/0083669 A1* | 4/2010 | Foster et al. | 60/802 |

* cited by examiner

*Primary Examiner* — Phutthiwat Wongwian
*Assistant Examiner* — Arun Goyal
(74) *Attorney, Agent, or Firm* — Caseiro Burke LLC; Chris A. Caseiro (57) ABSTRACT

Disclosed is a high-power, fully-superconducting electric machine and major subcomponents including a dual (twin) superconducting, counter rotating, sub-scale bypass fan machine, 13-stage switched reluctance turbo-motor, electric compressor, annular ion-plasma combustor with electromagnetic electrodes, and a five stage superconducting counter-rotating turbine power generation machine which is capable of developing 2.5 MW per stage.

2 Claims, 10 Drawing Sheets

FULLY ADVANCED SUPERCONDUCTING SEGMENTED TURBO-ELECTRIC ROTORMACHINE (FASSTER)

RELATED APPLICATIONS

This application claims priority to U.S. Provisional Patent Application Ser. No. 61/418,166, filed on Nov. 30, 2010, entitled FULLY ADVANCED SUPERCONDUCTING SEGMENTED TURBO-ELECTRIC ROTORMACHINE (FASSTER), the subject matter of which is incorporated herein by this reference for all purposes.

In addition, this application is a continuation in part of U.S. National Phase application Ser. No. 13/059,240 filed Feb. 16, 2011 by Richard H. Lugg entitled MAGNETIC ADVANCED GENERATION JET ELECTRIC TURBINE which further claims priority to PCT Application Serial No. PCT/US2009/054317, filed Aug. 19, 2009 by Richard H. Lugg also entitled MAGNETIC ADVANCED GENERATION JET ELECTRIC TURBINE which further claims priority to U.S. Provisional Patent Application Ser. No. 61/189,365, filed Aug. 19, 2008 by Richard H. Lugg entitled MAGNETIC ADVANCED GENERATION JET ELECTRIC TURBINE, further claims priority to U.S. Provisional patent application Ser. No. 61/224,666, filed Jul. 10, 2009 by Richard H. Lugg entitled MAGNETIC ADVANCED GENERATION JET ELECTRIC TURBINE, the subject matter of which are also incorporated herein by these references for all purposes.

FIELD OF THE INVENTION

The disclosure relates aircraft engines, and, more particularly, to a superconducting electric machine for use with aircraft.

BACKGROUND OF THE INVENTION

Over the past 10-20 years research has focused on increasing jet engine performance while reducing engine weight and reducing the costs associated with engine production and maintenance. In particular, government and military funded programs have focused on using ceramic components for the hot section of gas turbine engines to allow for higher turbine inlet temperatures and, therefore, higher thermal efficiencies. In addition, research is focusing on a truly integrated engine and airframe propulsion system in which the engine casing becomes a part of the airframe. This would allow for a dramatic weight reduction in overall weight and an increase in engine performance. However, these development programs have focused on 70 year old gas turbine technology.

In addition, the DOD and Armed Services are now demanding significant increases in electric output from turbine flight engines. For example, there are now requirements for the generation of up to 2-5 megawatts of electrical power that is needed to power on-board directed energy weapons and all electric aircraft subsystems. Currently, US Air Force requirements for future unmanned and manned systems are demanding propulsion capabilities which can sustain supersonic speeds as in Mach 1.5-3.5 across a complete flight regime, lift-off to landing, and deliver high power energy weapons with all electric sub-systems for aircraft function. Future aircraft concepts are demanding in excess of 1.0 megawatt of power which current turbine engine companies cannot deliver off of their present engine designs, largely because they are restricted by the reduction performance of gear boxes, drive shafts and the generator added on as an additional component which is not made by the OEM engine supplier.

In traditional gas turbine engines, the combustor/propulsor, dynamic components are designed to be in tension with heavy axial drive shafts (or spools), and gear boxes. These systems are quite heavy and typically limit the thrust to weight ratios to not more than 7 to 1.

Accordingly, a need exists for an engine design that is able to provide very high thrust to weight ratios, has optimized aerodynamic flight conditions across the entire flight envelope and can generate substantial surplus electrical power output.

A further need exists for a turbine engine design without a drive shaft (and its volume and weight constraints) that has optimize aerodynamic efficiency along with lightweight high temperature materials.

Yet another exists for new engine turbomachinary that utilizes new high power electromagnetics to electrically segment the bypass fan from the compressor and the turbine.

SUMMARY

Disclosed herein is a high-powered, flight-weight fully Superconducting Electric Machine comprising a dual, counter-rotating superconducting rim driven electric machine and bypass fan(s), a fully segmented 13 stage electric compressor driven by DC switched reluctance turbomotors, and a 5-stage variable high and low speed power generation turbine utilizing embedded superconductors on the rotor and stator. The apparatus uses electric current in superconducting coils in the rotor and stator to induce electric current in a magnetically levitated rotor with the capability of generating up to 4-5 times the electric power of conventional ring motor architectures.

According to one aspect of the disclosure, a superconducting generator turbine apparatus comprises: a plurality of counter rotating bypass fans, an electric compressor, an annular ion-plasma combustor with electromagnetic electrodes, and a multi-stage superconducting counter-rotating turbine power generator capable of developing at least 2.0 MW per stage.

According to a second aspect of the disclosure, a superconducting generator turbine apparatus comprises: (A) a generally cylindrical frame; (B) a plurality of counter rotating bypass fans, (C) a turbine disposed within the cylindrical frame and configured to generate electrical power, the turbine comprising: i) at least one arcuate blade array movably coupled relative to the interior surface of the cylindrical frame, ii) a plurality of induction coils disposed about a perimeter of the cylindrical frame; and (D) a combustor configured to generate plasma exhaust comprising ionized molecules of a first polarity; wherein a bypass air flow tunnel is disposed at a the center of the exoskeleton and extends from the plurality of counter rotating bypass fans through the electric compressor section, ion plasma combustor, superconducting power turbine, and through an exhaust nozzle, and wherein a thrust created by the turbine apparatus has a greater component of bypass air then combustion exhaust.

DETAILED DESCRIPTION

The hybrid engine technology described herein is termed Fully Advanced Superconducting Segmented Turbo Electric Rotormachine (FASSTER) and offers a highly efficient, subsonic, transonic and supersonic, variable bypass ratio, and compression ratio, engine design. The engine operates electrically by generating a large amount of on-board electric power through its superconducting electric ring generator system and utilizing that high power density electricity to drive axial compressor and bypass fans rather than drive shafts or spools. The engine produces sufficient power to operate the multi-stage counter rotating, superconducting, dual ring motor electric bypass fans (two stages) and superconducting electric ring motor axial compressor (eight stages). Typically, the engine described herein may be in the 25,000-50,000 lb. thrust class, although other thrusts may be developed and used depending on specific OEM aircraft propulsion system requirements. The 25,000-50,000 lb thrust class allows the engine described herein to replace current engine technology for the new wide-body jet airliners and medium-to-large size business jets which have been hardest hit by global pricing surges in oil.

In the engine described herein, the electrical generation is provided by superconducting ring generators that are powered by the high velocity exhaust effluent from the combustor impinging upon the turbine blades of each staged superconducting turbine ring generator (a high pressure turbine ring generator, mid-pressure ring turbine, and a low pressure ring turbines). The bypass fan is a twin fan system in which one fan counter rotates in relation to the other fan, which reduces aerodynamic swirl and drag, and increases thrust efficiency.

The bypass fan configuration is not constrained by a drive shaft (multiple spools) heavy gears and complex gear boxes, nor complex lubrication systems. The bypass fans running independently from the compressor can be run at much slower speeds than the compressor, allowing for a more efficient RPM for the larger diameter fan blade designs, and fewer blades, thus raising its efficiency to push air past the compressor core and power ring generator turbines, offering very high thrust to weight ratios and overall engine and fuel efficiency improvements. Additionally, the lower operating speeds afford the use of wider blades, raising aerodynamic efficiency and thrust per horsepower, making the engine architecture greatly more efficient than the current art of engine designs. The electric compressor is designed with fewer stages than that of current turbine technology. The compressor is an axial, multi-stage concept design of 8 stages; three (5) low pressure stages and three (3) high pressure stages. Where the preliminary design is in the engine program, stage count may be reduced as numerical analysis is further completed of compressor efficiencies. Current art of turbines in this thrust class to produce similar power would take at least thirteen (13) to (17) compressor stages to compress a similar mass air flow up to pressure ratios of 35:1, where as the disclosed electric, counter rotating, stator-less compressor can take the same mass flow condition to pressure rises up to 65:1. This is possible as each stage operates independently from one another, as they are independently electrically driven by superconducting rotors, thus each stage ratio efficiency can be raised considerably. As the superconducting ring motors for the compressor do not require a drive shaft, nor the bypass fans, or the superconducting ring generators of the power turbine, a "hollow-core shaft-less" tunnel is left in the center of the hybrid exoskeleton turbine which now carries additional bypass air, and thrust, directly increasing bypass ratio beyond any current state of the art turbine propulsion systems. Bypass air as the major component of thrust, rather than the hot exhaust from the power turbine being utilized as thrust, is a more efficient method of producing thrust for propulsion in gas turbines. Therefore, in the disclosed architecture, the majority of electric power produced from the superconducting ring generator power turbines via the superconducting ring generators is directed forward, through a sophisticated and proprietary electric power management system architecture to run the electric bypass fans and the electric compressor. This electrical independence of the bypass fan from the multi-stage axial compressor can potentially raise overall thermal efficiency of the engine from 86% to 99% alone, not accounting for improvements in bypass fan efficiency, thrust to weight ratio (fewer rotating components as in compressor diffuser stages), lower specific fuel consumption.

Turbine Architecture

The disclosed dual counter rotating bypass fan architecture establishes driving efficiency in turbine engines in a leap frog fashion, rather than an incremental fashion in improving efficiency. The disclosed electromagnetic architecture offers the benefit of a segmented superconducting ringmotor where the electromagnetic architecture and levitation coil and Halbach Arrays may be shared, across a single common trunion within the exoskeleton architecture of the engine, but at the same time optimal design speed may be calculated for each fan, and mass flow swirl is reduced by the counter rotating aerodynamics design point while simultaneously dramatically improving bypass mass air flow, thereby driving thrust efficiency. Two single counter-rotating 60" superconducting ring motor bypass fans deliver approximately 10,800 lbs. of thrust each from 3.73 MW of electrical energy and 5,000 shaft horsepower (one pound of thrust for every 343 watts of power); total being 21,600 lb. of thrust at 7.46 MW, which provides, based upon the foregoing, a continuous torque per unit active mass of 7.50 Newton meters/lb. and a torque per unit volume of 7500 Nm/m3.

Combined with the thermal efficiency gain in the exhaust stream from the superconducting segmented turbine, total thrust output may approach 26,000-28,000 lbs. of thrust based on these power densities that have been examined in a superconducting bypass fan, putting a technology demonstrator engine in a thrust class for a Boeing 737-700 series aircraft. The initial design speed for the front bypass fan, fully loaded, has been set at 2,750 RPM (approximately 200 m/s or 659 f/s at the tip) and the rear bypass fan has been set at 2500 RPM. The disclosed superconducting ring motor positions two concentric rings: (i) the inner ring, which constitutes the rotating component (the rotor) and, when in motion, be maintained in plane with the outer ring by magnetic levitation; and (ii) the outer ring (the stator), which is stationary. In both cases, the rotor and stator are to be designed in such an electromagnetic architecture that a synchronus AC superconducting coils may be used in both ring architectures. In the disclosed engine having a superconducting bypass fan both stator rings of the exo-skeleton outer ring may be made from advanced materials, primarily lightweight metal alloys (hastalloy) and carbon nano-tube fiber reinforced composite. The inner ring body, termed a trunion, consists of fan blades and the perimeter ring structure fabricated from a Hastalloy with the fan blades attached at the fan hub and attached at the tips of the perimeter trunion ring, fusion welded with MIG to TIG to assist in a low coast prototype and rapid assembly. The trunion with house the layered architecture of superconducting coils, preferably the latest 3G ribbon, and sealed in the trunion, with access to it only by the cryocooler providing operating temperatures to 77 K. In this case, since the inner rotor is rotating and there is no fixed access to house the cryocooler, the cryocooler runs off the back end of the hollow shaft with feed channels in the shaft and the blades extending circumferentially out to the superconducting coils in the rotor trunion.

In an illustrative embodiment, the fan blades and the perimeter ring structure of the FASSTER architecture may incorporate passive thermal cooling passages that lead to a cooling medium reservoir in the hub. The circumference of the inner ring (the rotor) contains several sets of induction coils (two separate sets of coils for levitation and one set for propulsion), and passive thermal cooling passages surrounding the induction coils. The outer ring (the stator) holds the motor's cryogenically cooled, high-power, superconducting electromagnets, and also holds the levitating and positioning Halbach Arrays (consisting of neodymium-iron-boron permanent magnets). A cryogenic cooling system provides coolant to the superconducting electromagnets in the outer ring. The outer ring may be surrounded by a highly efficient insulating material, such as Aspen Aerogels, silicon carbide blanket aerogel composite. The outer ring may also have contact strips coated with a polymer that has a low coefficient of friction to provide rotor support during startup; to constrain out-of-plane, in-plane and shear loads outside of the design criteria.

Exoskeleton Exterior

Figure 1:
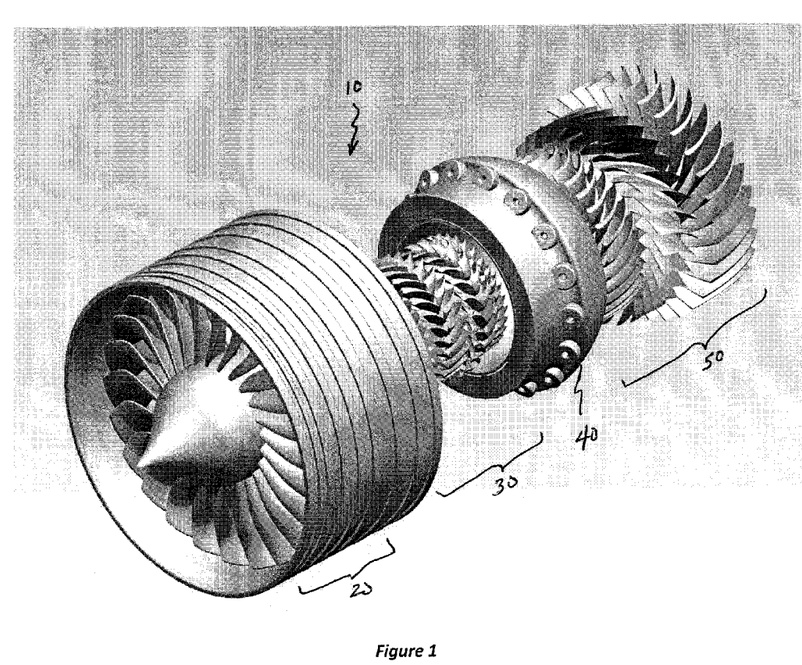
FIG. 1 is a side perspective conceptual CAD representation of the FASSTER turbine generator apparatus, in accordance with the disclosure, including a superconductng dual bypass fan, compressor, ion plasma combustor and power generation turbine.
Figure 3:
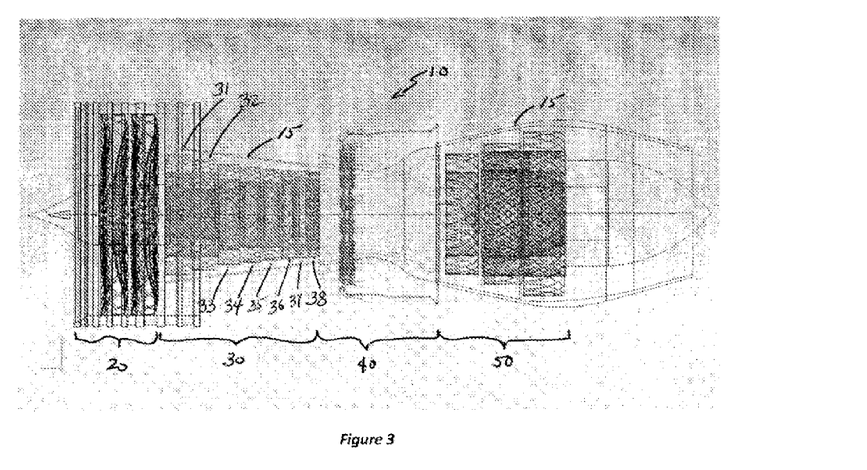
FIG. 3 is a side cut away CAD rendering of the FASSTER turbine generator apparatus illustrating the exoskeleton, segmented, dual bypass fan, electric compressor, ion plasma combustor and STRG turbine generator stages in accordance with the disclosure.

FIG. 1 is a side perspective conceptual CAD representation of the FASSTER generator/turbine 10 comprising a superconductng dual bypass fan stage 20, compressor stage 30, ion plasma combustor stage 40 and power generation turbine stage 50. As illustrated in FIG. 3 the FASSTER turbine 10 further comprises an exterior shell or exoskeleton 15 encompassing stages 20-50.

Figure 4:
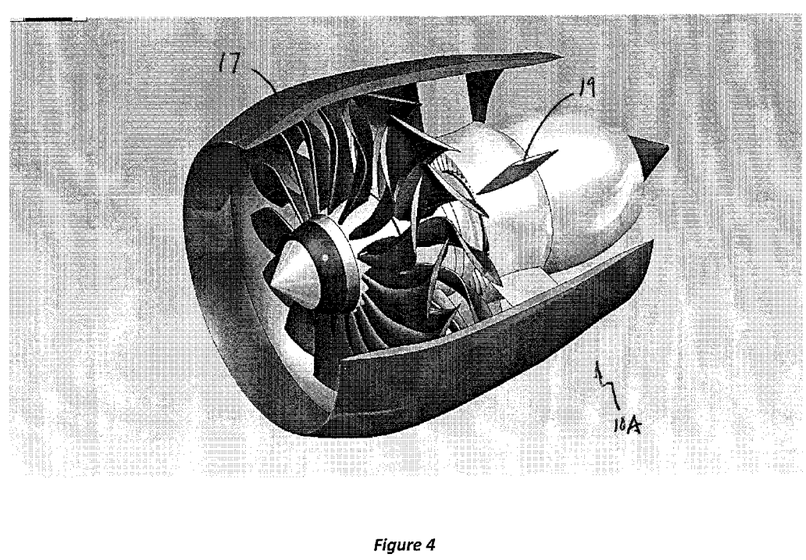
FIG. 4 is a conceptual side, partially cut-away perspective CAD representation of the FASSTER turbine generator apparatus, in accordance with another embodiment of the disclosure.
Figure 5:
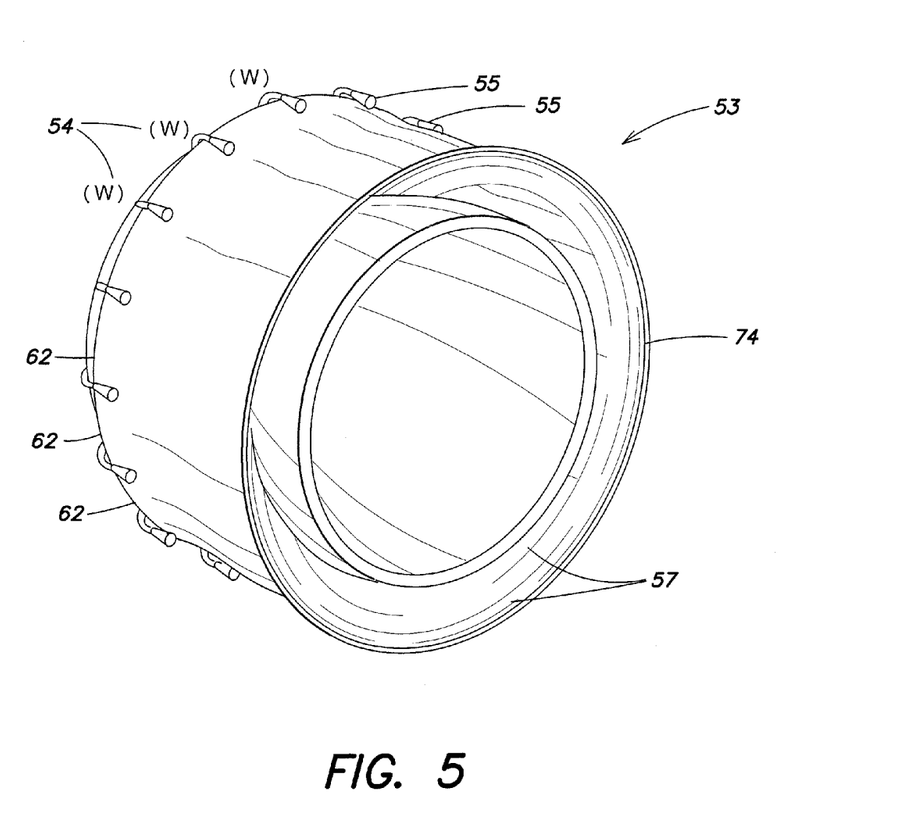
FIG. 5 is a perspective view of an ion plasma combustor in accordance with the disclosure.
Figure 6:
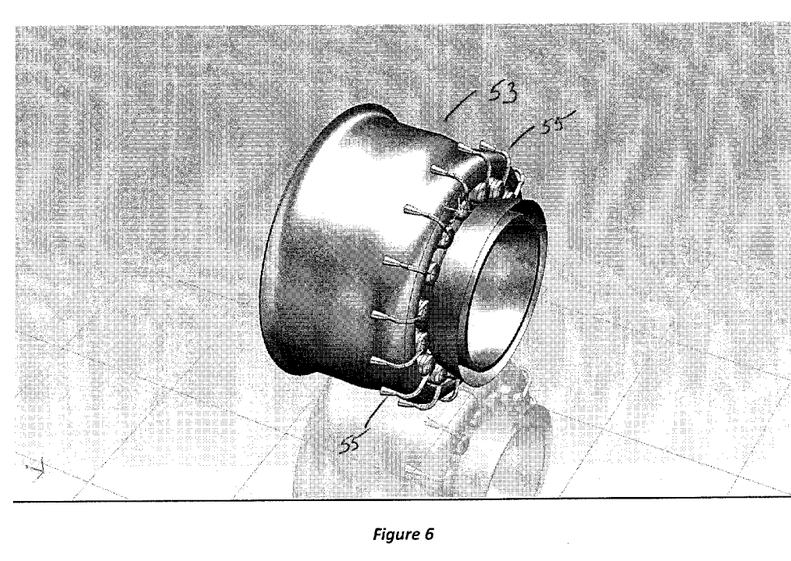
FIG. 6 is a rear perspective rendering of an ion plasma combustor ion plasma depicting injector electrodes from the rear in accordance with the disclosure.
Figure 7A:
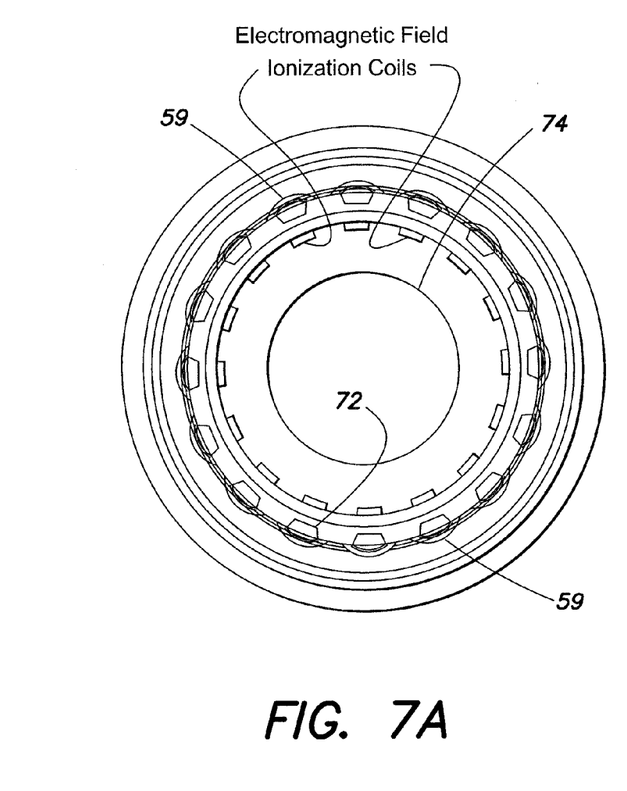
FIGS. 7A-B are front and side transparent views, respectively, of the plasma combustor of FIG. 5.
Figure 7B:
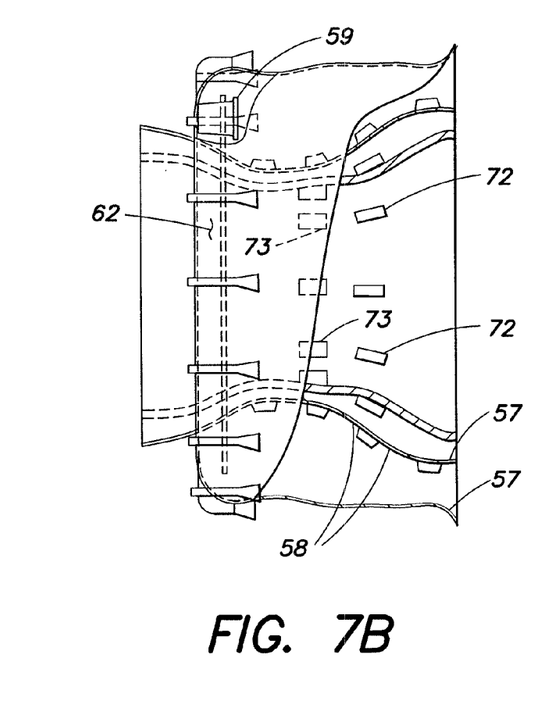
Figure 8A:
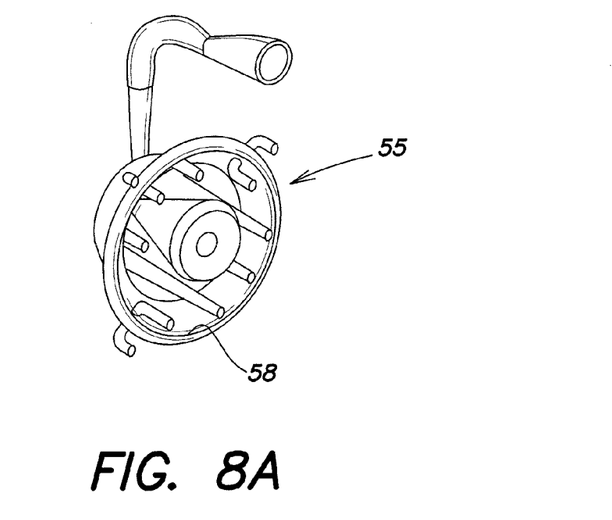
FIGS. 8A-B are perspective and side transparent views, respectively, of the fuel injector of the plasma combustor of FIG. 5.
Figure 8B:
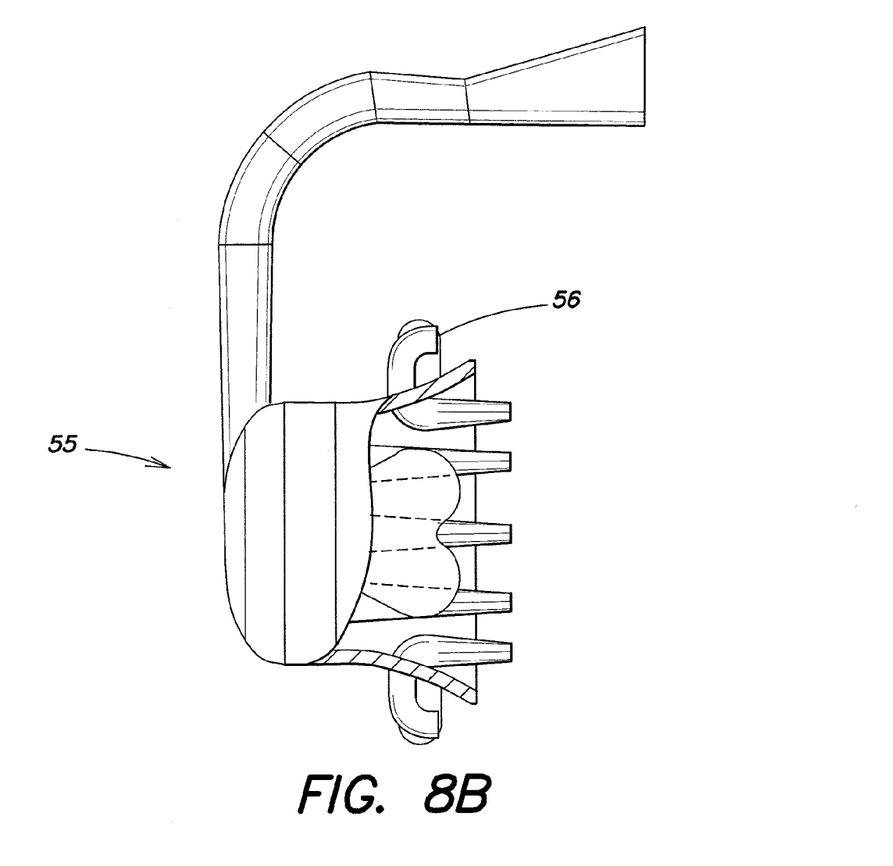
Figure 9A:
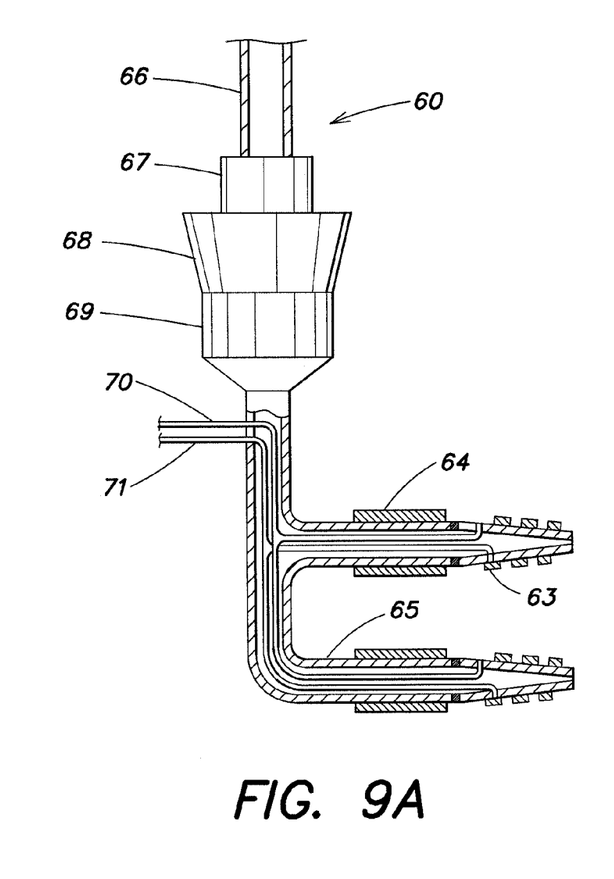
FIGS. 9A-B are conceptual, cross-sectional view of double and single port fuel injectors, respectively, of the plasma combustor of FIG. 5 in accordance with the disclosure.
Figure 9B:
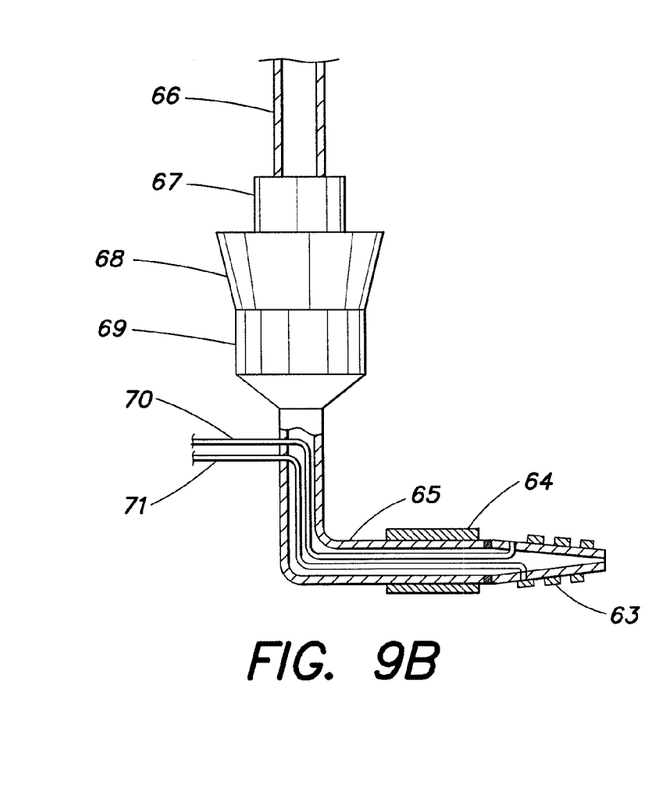

FIG. 4 is a side perspective conceptual CAD representation of an alternative FASSTER turbine generator apparatus 10a, in accordance with another embodiment of the disclosure. In embodiment, is substantially similar to that of turbine 10, with the addition of an outer casing 17 separated from the turbine exoskeleton a plurality of pylons 19 or diffusers. In addition, the tool rotating fan blades of stage 20 extend radially outward to the full diameter of the outer casing, as illustrated. In this embodiment, an increased amount of bypass air flows around the generator/turbine itself, with a majority of the thrust created by turbine 10 comprising bypass air.

In the turbine 10, the load bearing surface is the exoskeleton 15, i.e., the rotating machinery spins against the outer wall of the hybrid engine where the magnetic levitation air bearings are located, thus the centrifugal forces developed as the machinery spins to generate power are directed against the exoskeleton 15. The turbine 10 is designed to operate at the higher more efficient combustion temperatures for Jet-A fuels and biofuels. A more complete combustion from the higher compressed air temperatures is achievable, further sustained by control of the fuel ionization by the ion plasma combustion and control and placement of the flame front electromagnetically, and the electrically driven and segmented compressor, which affords compression ratios as high as 65:1, twice as high as current engine technology.

The FASSTER architecture described herein generates multi-megawatt levels of electric power in a fully integrated multi-stage superconducting turbine ring generator (three stage STRG). Presently the FASSTER architecture is a 31,000 lb. thrust class engine for a regional jet airliner concept, which approximates 28,400 shaft horsepower. In an illustrative embodiment, the electric machine architecture is 87" for the first of two counter rotating bypass fan stages at the I.D. inner trunion face, each at 9.4 MW each. Total turbo electric power is 35.0 MW (power turbine generation), putting the final engine design in N+3 at approximately 31,200 lb. thrust class operating at cruise conditions and standard day, e.g., Mach 0.85 and 35,000 feet. The disclosed $1^{st}$ and $2^{nd}$ stage bypass superconducting ring motor electrical machines total 18.8 MW with the first superconducting compressor ring motor at 2.5 MW, followed by the next eight stages, at 2.2, 1.9, 1.6, 1.4, 1.2, 1.0, 0.8, 0.7, 0.5 MW, totaling 13.8 MW, in declining order, with the dual bypass fan at 18.8 MW, totaling 32.6 MW consumed by the superconducting bypass fan stage 20 and compressor stage 30. To match the power consumption ratio from the superconducting power generation turbine 50 it delivers a nominal 35.0 MW at max power at 15,000 RPM with 16.0 MW at the first stage 52, 12.0 at the second stage 54 and 7.0 MW at the third stage 56, leaving potentially up to 2.4 MW of surplus power for ancillary engine systems, power run off at the turbine stages, and customer power (aircraft).

Bypass Fan Stage

Bypass fan stage 20 of the turbine 10 utilizes counter-rotating dual axial bypass fans 22 an 24, with a diffuser 26 disposed intermediate fans 22 an 24, and a diffuser 28 at the axial fan exit, as illustrated in FIG. 3. This includes a rotating blade row in between the dual bypass fan stages, having blades that receive a subsonic entry flow in the absolute frame and decelerate the flow to a lower subsonic velocity exit flow, while adding work to the flow to increase stagnation pressure. For subsonic entry flow the counter rotating bypass fan and the counter rotating diffuser, slowing of the flow path to ideal inlet conditions may be obtained electrically, hence less kinetic energy from the flow path needs to be absorbed by the inlet and a lighter structural and more aerodynamically effective inlet is achieved along with improved laminar flow dynamics to the engine bypass fan face.

The counter rotating diffuser in the bypass fan stage 20 reduces airflow swirl and back pressure to the compressor stage 30 thereby maximizing the diffusion of inlet airflow at the high subsonic Mach number condition (Mach 0.98) before it enters the electrical compressor. In the supersonic diffuser of the turbine, the supersonic derivative of the engine airflow swirl can be further reduced as inlet air is slowed to a subsonic condition, maximizing diffusion prior to entering the eight (8) stage electrical compressor. Subsonic exit guide vanes downstream of the diffuser are used to remove swirl from the subsonic flow before it enters the low pressure and high pressure compressors, and the bypass duct. The counter rotating electric supersonic diffuser in the bypass air flow for subsonic flight operations reduces airflow swirl toward the compressor, creating laminar flow upon entrance of the flow into the compressor. This maximizes the performance of the first several stages of the compressor stages 1-3, increasing baseline compression ratio efficiencies and ultimately creating close to 50% compressor efficiency increase, stage to stage, by creating a laminar flow control of air prior to the compressed air temperature rise and combustion.

For any constant speed of airflow, specific flow can be increased by electrically reducing the current to the rotor and its subsequent back pressure, which therefore can be decreased until the rotor chokes (back pressure goes to zero), therefore the turbine can have constantly corrected airflow for all flight conditions, and at all bypass fan and corrected air speed and airflow rates. Ultimately the set point of surge and choke lines can be offset by the electrical control of each of the individual compressor stages and corrected through an embedded sensor system essentially eliminating an off-design engine condition. For any flight condition, FASSTER TURBINE is "on design" in operation and optimized as a gas turbine electric machine. Within the compressor, the turbine has a higher hub/tip design ratio on the compressor blades, across all the compressor stages. This allows for a larger variation in sweep, mean blade axial length, and blade velocity. Thus, each stage loading can be higher as mass airflow proceeds along the axial length of the compressor. Stage load can be higher as the tangential velocity is maintained at the proximity of the blade tip, at the integrated electromagnetic trunion. The trunion acts as the aerodynamic structures interface which houses the superconducting induction magnetics and whereby the rotors and vanes of the respective bypass fan, compressor and turbine blades attach to and the outer ring is formed which is the barrier to the shear gap and inner wall of the generation electromagnetics (not at the medial end of the blade where a drive shaft would be located normally in prior art). The mechanical force vector is thus higher because of the blades being tip driven with electric power generated by the superconducting ring motors. In this way, tangential velocity and blade loading may be increased allowing for increases in sweep, blade area and mean blade axial length. In this way, higher hub/tip design ratios can be engineered in blade design that allows for higher mass flow and therefore higher performance with fewer compressor stages. Additionally, a twin counter rotating bypass fan may be used to achieve a higher mass air flow at greater loadings, allowing for higher thrust in the turbine than in similar sized prior technology art aero engines.

Compressor Stage

Compressor stage 30 of the turbine 10 utilizes multiple compression sub-stages 31-38 to achieve improved compression ratios. In the illustrative embodiment, compression sub-stages 31-38 arranged sequentially in order of decreasing blade array diameter, as illustrated in FIG. 3. A In the turbine 9.5:1 compression per stage compression ratio may be achieved and thus each stage compression ratio may be as high as 17.5 to 18.0:1. This higher compression ratio improves mass airflow, air density and increases the airflow temperature allowing for an overall compression ratio of 65:1 to 75:1 over the entire compressor.

The achievement of very high compression ratios in new engine designs, over current designs, is a key factor in achieving lower fuel burn rate, reduced emissions and higher thrust specific fuel consumption (TSFC). The disclosed FASSTER architecture also provides for optimization of flow area, in the $90^{th}$ percentile range, and the optimized dimensions of the flow path from one compressor stage to the next is achieved as the compressor blades are an integrated structural and aerodynamic component of the outer ring trunion where the superconducting induction coils are located, and also where permanent magnets are located on the inner rotor trunion, for generating opposing forces for the magnetic levitation with the Halbach Arrays in the opposing outer turbine ring wall. This allows for the removal of eddy currents from the air flow and for the removal of aerodynamic non-laminar anomalies. These aerodynamic anomalies introduce significant drag induction to the optimization of the flow path in typical turbine design but are reduced or may be made obsolete in the FASSTER TURBINE engine architecture.

Additionally, the integrated structures of the turbine, i.e., the blending of the blade tips to the inner walls of the inside superconducting ring motor trunion and inner ring save weight as out-of-plane loads are removed as the engine operates mechanically in a no load mechanical extension condition. With the exo-skeleton structure, it operates in a compression mechanically loaded condition. In-plane, and axial loads are carried through to the circular structure of the ring motor trunion and turbine ring generator trunions, hence compressor blade, fan blade and turbine blade dimensions and materials can be optimized to the lightest weight for operation and cooling. In the various compressor stages, blade number and spacing may be reduced and the tip chords and root cords of compressor blades are increased thereby increasing mass air flow loads at reduced RPM. This also allows for increased stage loading, raising compression efficiency, and thus a lower number of compressor blades and stages are utilized in the axial compressor design of the FASSTER TURBINE design, this reduces blade count by 15% to 20%. This reduced weight and increased compressor efficiency also increases fuel temperature burn, and fuel efficiency in operation at all flight conditions (enthalpy environment increase promoting cleaner fuel burn and reduction of oxide emissions). Additionally, lower blade counts improve blade cooling as flow path dynamics and entropy is reduced due to higher mass flow rates per blade in any rotating compressor stage. In the compressor stages, chord to height ratios, C/H, can be increased due to higher stage loading conditions. This is possible because of the rim driven electrical drives on the bypass fan(s) and the compressor stages not having sequential following of diffuser stages, as well as the power turbine where as a power generation machine, height ratios C/H are equally as important.

The mechanical load capacity of a rim driven electric machine is higher than a traditional drive shaft machine, as are the size and direction of the tangential velocity vectors at the trunion blade tips of each stage. In the turbine, force vectors are larger in magnitude and direction, thus tangent velocities are greater, at the bypass fan and compressor blade chord height ratios, therefore a higher loading per fan blade can be sustained per stage. The counter rotating bypass fans and rotating diffuser and counter rotating compressor stages in the turbine are electrically driven independently, thus creating a different loading coefficient from the first bypass fan stage to the second bypass fan stage, and first compressor stag to the second compressor stage, and so on. This allows for the mass flow loading differentials to be maximized to each velocity vector of each fan and follow-on compressor stage. This then allows the diffusion factors for each fan and compressor stage to be adjusted electrically by varying the RPM and the loading factor on the fan blades and compressor blades. This allows for the axial length velocity to be maximized for each stage and blade Mach number raising the overall engine efficiency and fuel burn. The independently driven compressor stages also allow for additional compression of the fluid flow direction between the each counter rotating rotor, and for the blade airfoil camber line. The airfoil profile is therefore distributed differently from the current art across the camberline to reduce drag losses and raise stage coefficient efficiency. Past work in 2008 on the FASSTER architecture in the electric compressor design showed the potential to raise each compressor stage efficiency level by 40% or more.

The disclosed FASSTER turbine architecture allows for the airfoil profile of the compressor blades to have more wash-out, i.e., a higher pitch as compared to chord length, and ratio of chord to thickness is greater all contributing to lower drag—greater chord compared to thickness, and less thickness at the mean aerodynamic chord. In general, the greater thickness is distributed more forward as it relates to the camberline. This increases lift and decreases drag for each airfoil, and increases the compressor ratio per stage. This allows for greater thrust to weight ratios and lower overall end-to-end drag coefficients, along with increased overall engine performance and efficiency. The FASSTER turbine can have lower bypass fan speeds as the bypass fans are differentiated from the compressor electrically. At lower fan speed settings, the inlet guide vanes to the fan at the front of the engine can be radically differentiated in terms of inlet flow angle, and thus reduce the drag of the mass air flow as it impinges on the bypass fan blade, and subsequent impingement on the first several stages of the compressor. The higher the chord to height ratios can be increased, the slower the speed requirements of the fan, and hence increases in efficiency. As discussed above, the turbine reduces the need for the number of stages to achieve the same compression ratios required for combustion. The number of compressor stages is reduced by: 1) Inlet flow angle to compressor stages reduced 2) Tip radius and hub radius of compressor blades are reduced increasing compressor efficiency and reducing drag, 3) C/H ratios can be reduced on the compressor rotating stages, therefore compressor blades may be closer together. This increases pressure ratio per stage, thus higher compression ratios may be achieved down the length of the axial compressor with fewer stages 4) The airfoil profile is distributed differently from current art across the camberline to reduce drag losses and raise stage coefficient efficiency. As in the case of the FASSTER turbine architecture the airfoil profile of the compressor blades have more wash-out (higher pitch as compared to chord length and ratio of chord to thickness is greater all contributing to lower drag—greater chord compared to thickness) and less thickness at mean aerodynamic chord, with greater thickness distributed more forward as it relates to the camberline. This increases lift and decreases drag, subsequently increasing compressor ratio per stage with these blade designs, 5) The rotating compressor stages in the hybrid turbomachinery are driven electrically, and all independently, thus creating a different loading coefficient from the first compressor stage to the second compressor stage, thus the mass flow loading differentials can be maximized to each velocity vector of each compressor stage, consequently diffusion factors for each compressor stage are adjusted electrically (variation of the RPM and therefore the loading factor on the compressor blades), thus the axial length velocity can be maximized for each stage and blade Mach number optimized to dramatically raise compression design points and overall compression ratio, 6) Better optimization of flow area (in the 90 percentile range) and associated dimensions of the flow path from one compressor stage to the next is achieved as the compressor blades are an integrated structural and aerodynamic component of the outer ring trunion where the permanent magnets are housed.

The lower number of stages required to achieve a desired compression ratio allows for a compressor design to effect mean-line diffusion factors—D, and mean-line solidity—A, and polytropic efficiency—E, thus effecting the overall efficiency of the compressor machine as a compounding medium and consequently the overall compressor ratio across the turbine machine. Higher compression ratios (above 35:1) offer greater efficient fuel burn, reduced power and drag losses and greater overall thrust in the turbine. The ideal is to raise polytropic efficiency above 94%, of which state-of-the-art designs do not exceed (typically for high performance military low-bypass turbofans efficiency is at 86-88%). In the FASSTER TURBINE architecture, because each rotor stage can be independently controlled, the rotor stages can operate at different Mach numbers, where for each state the Mach number can be maintained, or increased, hub/tip ratio reduced, axial Mach number increased, and the total change in temperature across each stage, instead of being constant, can be raised having a positive effect on the atomization of the fuel as the compressed, high pressure air (and thus heated air), enters the combustor. Inlet guide vanes are designed to add swirl in the direction of rotor motion to lower the Mach number of the flow relative to the rotor blades. The FASSTER TURBINE architecture allows for the first rotor compressor stage velocity, and angular vector, which may be adjusted to match more closely the inlet Mach number, the ability to create a rise in energy conservation as the mass flow moves to the second compressor stage. The second rotor stage can be set at the optimum velocity therefore to match the falling Mach number due to swirl and the velocity vector of the preceding rotor stage in the superconducting electric compressor. This allows for the electric compressor energy to be conserved so that the compression ratio can be increased to a higher level per each given unit of energy consumed.

This is unique and novel in engine operation to the FASSTER TURBINE hybrid engine technology, as in current state of the art turbine engine designs this capability is not possible because all the rotating machinery in question is attached to non-variable constant speed drive shafts or spools. Rotating stall may consist of one or more multiple cells that rotate around the compressor at an angular speed which is a fraction of the rotor speed. This instability results in a loss of compressor performance that may require the shutdown of the engine to clear out. Operating a compressor in rotating stall can contribute to fatigue damage of the blading resulting from the rotating stall unsteady aerodynamic loading. Also the loss in compressor performance during rotating stall can move the compressor to the operating point where surge is initiated by the operating point crossing the surge line. In the FASSTER TURBINE engine architecture, variable speed compressor stages may operate at different speeds and therefore adjust the velocity of flow, angular velocity, Mach number flow, and angular tangential vector, shock, pressure ratio, and compression efficiency, so that the surge margin, or compressor stall point may not only be reduced, but that it can be controlled. Consequently, operation at peak pressure rise may be maintained and the surge point moved closer to the maximum compressor efficiency operating point without crossing it into stall or surge conditions. In the turbine, each stage has an optimized RPM and velocity of flow Mach number set from the preceding stage to the next. The design point of the electric compressor is set to maintain the velocity and the pressure of the exit flow from each counter rotating rotor stage, to the next subsequent counter rotating rotor stage, rotating at a different RPM, but set to the optimization pressure, temperature and Mach number of the flow to maximize pressure rise between the stages. This optimization is accomplished by actually lowering the flow rate a small percent between the stages. The "stage efficiency" of an adiabatic multistage compressor is defined as the ratio of the ideal work per unit mass of flow to the actual work per unit mass flow between the same total pressures. The other key measure is the polytropic efficiency of an adiabatic compressor, which is defined as the ratio of the ideal work per unit mass to the actual work per unit mass for a differential pressure change.

In the limit, as pressure ratio approaches on for a given stage, the "stage efficiency" approaches the "polytropic efficiency". In current art micro-flow energy, enthalpy and efficiency management cannot be done through the micro-management of the airflow between one compressor stage (rotor stage) and the next because every component is connected to a shaft. With the shaft-less FASSTER architecture design, each compressor stage, of eight (8) stages, can be run independently and therefore the micro-management of energy, enthalpy (and entropy reduction) and compression efficiency management is possible. In the turbine, every compressor stator rotor, i.e., the rotor, is rotating and driven electrically where compressor blades driven by the superconducting ring motors embedded in the trunions, compress the air from one compressor stator stage to the next, which is a slower moving airfoil blade row, thus having the capacity to add net energy to the flow, as well as acting as a conversion device to the flow, adding kinetic energy to the flow and raising the static pressure of the flow (entropy is conserved, enthalpy is increased).

This thermodynamic enthalpy reaction in the FASSTER architecture changes the Brayton Cycle, which is the engine cycle of all current turbine technology known art. Kinetic energy added to the flow provides an enthalpy reaction, raising heat addition and pressure to the second stage Phase of the old Brayton Cycle, hence a new proprietary engine cycle is created, currently termed the FASSTER TURBINE Electric Brayton Cycle™. Because each compressor rotor is driven independently and at different speeds, the engine may be used more efficiently at different stages of the flight envelope. Another advantage of the electrically driven compressor is that rotational speed of the rotor stages does not suffer from spool up or spool down time (the time spent increasing or decreasing the rotational speed of a drive shaft to which a set compressor stage is attached to) as is the case of current art in turbine designs. The speed of the compressor rotors can be more quickly adjusted due to the electric superconducting ring motor high tangential loads, and hence higher velocity force vectors, to achieve optimum performance of the engine based on different flight conditions, airframe loads, and therefore optimal combustion performance can be achieved.

Additionally, with the shaft-less design of FASSTER, a bypass "air flow tunnel" presents itself in the center of the exoskeleton from starting at the fan section, through the electric compressor section, ion plasma combustor, superconducting power turbine, and through to the exhaust nozzle. All the rotating turbomachinery of the design is in mechanical compression with the bypass fan, compressor rotors/stators and power turbine, therefore the FASSTER turbine has no blisks, generating electrical power from the power turbine utilizing the superconducting ring generators integrated into the outer engine casing of the turbine. Thus the bypass fan, compressor and power turbine of the engine are protected against "cyclic fatigue" which comes from the production of load paths resulting from the acceleration and deceleration of rotating machinery attached to drive shafts as is the case of current turbine technology. The FASSTER turbine suffers to a lesser degree from these load path buildups, and has significantly less cyclic fatigue of the rotating turbomachinery components, as the engine functions in an out-of-plane compression loading mode by there being no drive shaft and rotational inertia.

In addition, the turbine provides thrust as by-pass air around the combustor but also acts as a supercharger to the turbine. To achieve a supercharging effect on the turbine, mass air-flow is accelerated exponentially, in relation to the velocity of the air in question, at any given rate of change in time. The supercharging effect upon the turbine is due to the very high optimal pressures now achievable by the electric compressor, which can be tuned to the flight condition and altitude for which the electric compressor fan is designed. Because there is no drive shaft, the center "Donut hole" created by lack of a drive shaft offers flow through cooling which is routed to the center of the engine for cooling of the combustor casing thus lowering the "Delta rise" in temperature of combustion gases created from compressed air and atomized fuel. With the nine (9) stage axial compressor in the FASSTER turbine electric control of the compressor rotors can subsequently afford the ability to adjust the RPM of each compressor stage of the nine, and maximize the reduction of pressure drop, and hence pressure loss, as well as reduce the deleterious effects of swirl as seen in current turbine compressor art and related overall turbomachinery, across each compressor stage.

By adjustment of blade Mach number at the compressor tips with each compressor, kinetic energy of the mass flow is maintained, pressure build up is maintained, and the reduction of velocity in the compressor stages, from stage to stage, is kept to a minimum while building pressure ratio increases down the length of the compressor. The turbine allows for the electrical control input in fractional adjustments through highly sensitive speed and pressure sensors/controllers on the trunions of the rotor and the rotor ring such that the pressure loss coefficient, thus the differential of suction spillage off the compressor airfoils, which correlates to Mach number differential of each compressor rotor stage, and is minimized. The pressure loss coefficient integrated to the stationary deceleration losses of each diffuser, compressor losses and suction spillage at each compressor airfoil is also minimized from one stage to the next in the axial compressor, and the "total pressure loss coefficient" is reduced, hence raising total efficiency of the superconducting electrical compressor in the turbine.

These unsteady engine operations near or at surge and stall produce extreme loading for the turbomachinery blading, resulting in high cycle fatigue (HCF) failures. These failures cause the catastrophic failures of engines throwing turbine and compressor blades and completely shutting down in flight. Surge and rotating stall results in dangerous compressed and heated flow induced blade vibrations due to the rapid loading and unloading of the blading. The turbine allows for the electrically driven, stator and rotor electric interdependent/independent design to be sensor monitored and can delay the onset of destructive aerodynamic loading which occurs from the operation approaching a surge or stall point. Further, recovery from rotating stall and surge behavior is actually possible and also can be prevented because the surge and stall condition line can be an important issue as it is impossible to guarantee that an engine can avoid such behavior during its operational lifetime. As a result, it is necessary to accurately simulate the performance of a compressor undergoing a surge transient. To address the various issues associated with the transient performance of a gas turbine engine, it is thus necessary to implement an advanced simulation that models the entire engine. Such simulations can capture the importance of the compressor-combustor interactions that occur during engine transients, including rotating stall and surge, and their affect on blade row durability.

Combustor Stage

A combustor stage 40 comprises a combustor 53, which, in the illustrative embodiment, is an ion plasma combustor of annular cylindrical design as illustrated in FIG. 7A-9B. By means of an electric current provided by the turbine generators (54), fuel is injected into the compressed air flow through a series of ion plasma, dual mode (55) fuel injectors (56) which are located around the perimeter of the annular combustor. The annular shape of a double lip (57), with the fuel injectors sitting inside the double lip provides smooth transition (58) of the heated compressed air from the compressor, into the double lip and dissipates it into the multiple fuel injector discs (59) which surround each ion plasma combustor dual port (60) and single port fuel injector (61), which then cover the periphery (62) of the annular combustor. Each injector provides both a plasma coil generator made up of electric coils (63) and a permanent magnet to create the magnetic field (64) through the forebody of the injector (65) which holds the circular array of permanent magnets. The fuel is discharged under pressure from the ejector and is ionized by the plasma coil generator (63) and is then placed and controlled by the electromagnetic field created by the magnetic field array of the injector (64). Each combustor injector is made up of a fuel feed line (66), a fuel pump (67), a fuel filter chamber (68), and a fuel charge reservoir (69). Electric current from the high speed superconducting static electromagnetic 2-stage high pressure power turbine (15) provides electric power to a ground cable (70) and a direct current (DC) 3-phase charge line (71) which runs internally to the inner wall of the injector.

Combustor 53 comprises a series of magnetic flame holders, encased in high temperature ceramic coatings along the perimeter of the outside circumference of the transitional wall of the annular combustor (72), and a series of electromagnetic field ionization coils on the inner annular ion plasma casing wall (73), opposed to and opposite from the magnetic flame holder series, which collectively control the plasma mass flow, ion plasma fuel decay rate, fuel ionization density, electric charge, toxic emissions (CO2, SO2, NO2) and velocity of the combustion gases derived from the complete combustion of the plasma fuel as it exits from the front end of the combustor to the rear of the combustor where the magnets are encased in high temperature ceramic coatings along the perimeter of the outside circumference of the annular combustor and the inner transitional wall of the annual combustor.

The magnetic and electric flame holder (73) and combustion device systems (72) and manage the shape of the combusting flame front of the ignited plasma fuel/air mixture, which becomes ionized by the initial electromagnetic field charge at the injector and forms, at a very high temperature (2800 F) and high velocity (1850 ft/sec.). The plasma (fuel molecules holding a positive charge) then moves as a combustion front, moving from the front to the back of the ion plasma combustor, evolving the combustion process of consuming all the carbon based fuel through the superior atomization process which is catalyzed by the formation of the electric charged plasma. As the combustion front moves, the magnetic and electric flame holder and combustion device systems (72) and (73) retard the decay rate, which typically would follow a specific decay rate based on plasma density and rate of electric discharge, and sustain the electric charge so that may stay as a high speed plasma flow and benefit from being accelerated in the segmented electromagnetic plasma accelerator plate nozzle (19).

Upon combustion, the exhaust air expands and enters the turbine generator of the engine (1). An additional feature of the combustor is the cooling effect provided by the air passing through the hollow core in the center of the combustor (74), the design of which hollow core may be varied at the combustor to increase the cooling effect of the hollow core air flow.

The plasma enhancement through the use of the plasma-generating electrode fuel nozzle modifies combustion, flame structure, flame size, and flame power density extending the fuel-lean burn limits and therefore increasing caloric fuel burn efficiency. This ion plasma injection combustor technology consists of a proprietary electrode device embedded within the fuel injector delivering both a magnetic field and an electric field to the injector device of specific geometry, and applies electrical voltage to the atomized fuel stream prior to combustion—generating or creating a plasma of the fuel, and simultaneously delivers and positions the atomized plasma fuel stream into the ideal mixing locations within the annual canister architecture, inside the combustor. This effect essentially breaks down the long chains of hydrocarbons in the fuel into smaller parts allowing the fuel to be burned more completely, resulting in a lower SFC, and reducing $CO_2$, $SiO_2$ and NOx.

Power Generation Turbine Stage

Figure 10:
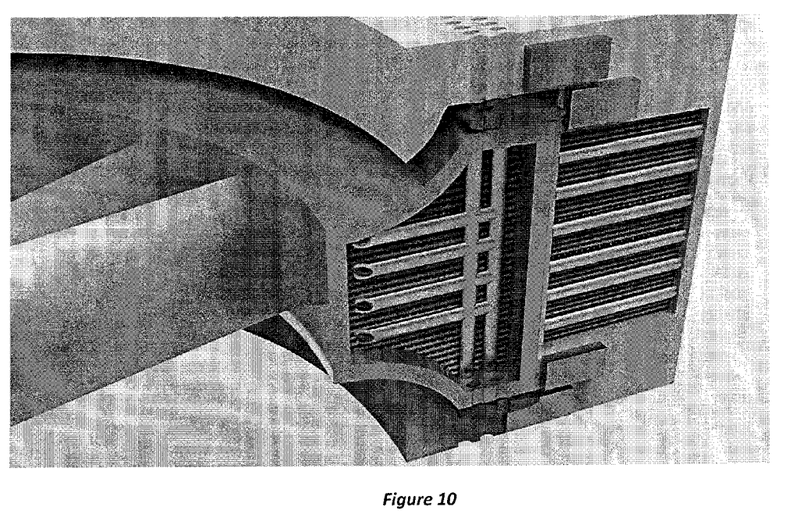
FIG. 10 is a conceptual side, partially cut-away perspective CAD representation of the FASSTER turbine generator apparatus, in accordance with another embodiment of the disclosure, including the STRG turbine generator stages in accordance with the disclosure.
Figure 11:
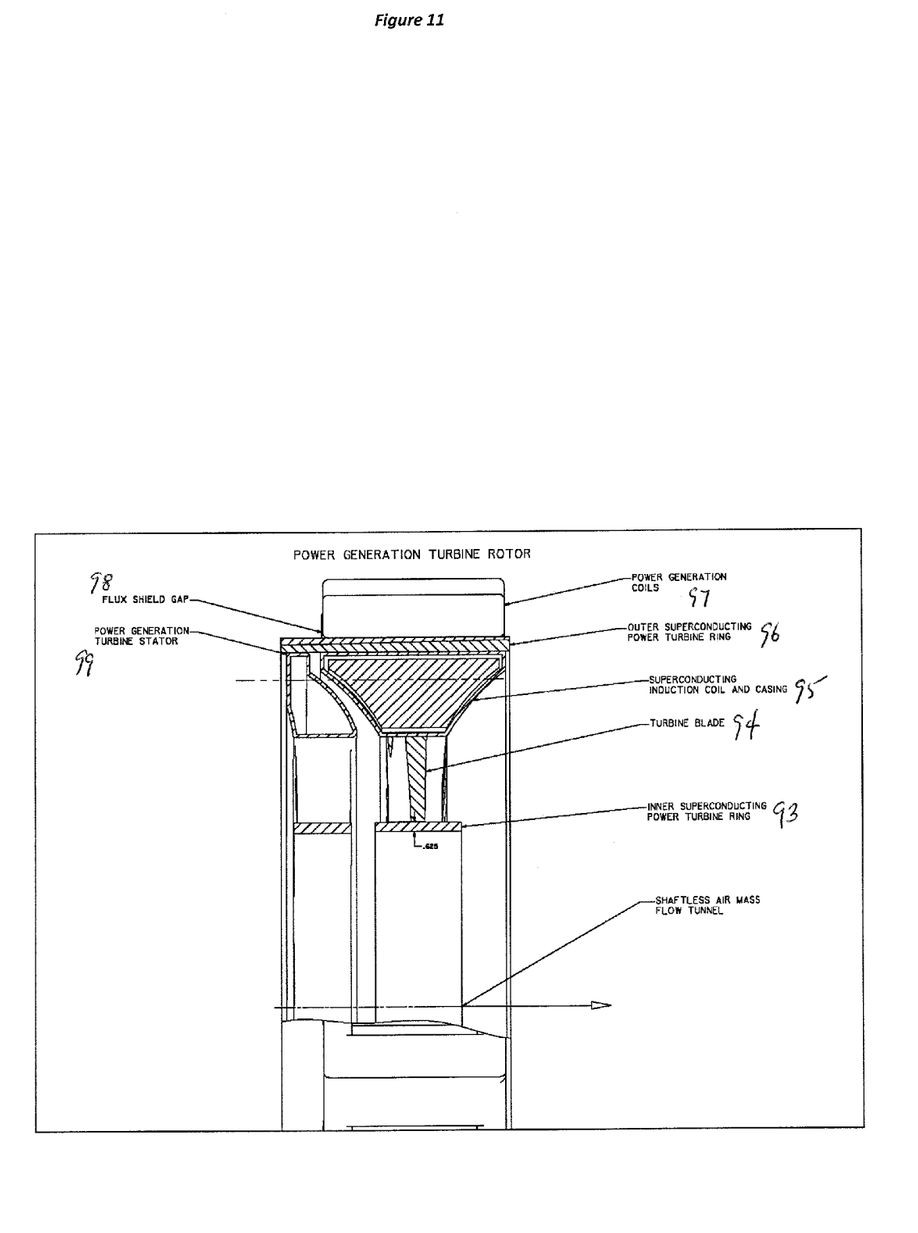
FIG. 11 is a conceptual side, partially cut-away illustration of the power generation turbine rotor of the FASSTER turbine generator apparatus, in accordance with another embodiment of the disclosure.

Compressor stage 50 of the turbine 10 utilizes multiple compression sub-stages 90-92 to achieve generate excess electrical power in accordance with the contemplated the design. Referring to FIGS. 10 and 11, is each sub-stage 90-92 may comprise a power generation turbine rotor assembly, as illustrated in FIG. 11. Specifically, sub-stages 90-92 may be arranged in order of increasing blade radius, as illustrated in FIGS. 1 and 3, in the aft direction and may comprise an inner superconducting ring 93 with plural turbine blades 94 extending radially from ring 93, a superconducting induction coil and a casing 95, an outer superconducting power turbine ring 96, power generation coils 97, a flux shield gap 98 and a power generation turbine stator 99.

Figure 2:
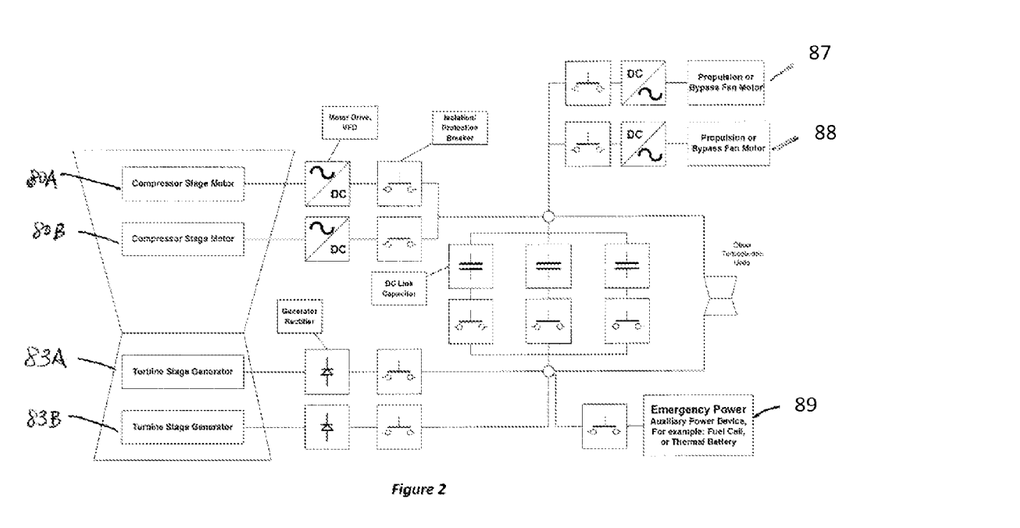
FIG. 2 is a conceptual schematic diagram of a FASSTER engine architecture, including subsystems in accordance with the disclosure.

FIG. 2 is a conceptual schematic diagram of a FASSTER engine architecture, including selected subsystems of the various stages 20-50. The schematic of FIG. 2 illustrates one possible implementation an Integrated High Fidelity Model of the FASSTER engine system. Alternate implementations are possible for example, FIG. 2 presupposes that power conversion equipment is used and a common DC link capacitor is employed. Many other variations are possible. FIG. 2 illustrates schematically the FASSTER engine architecture and subsystems including turbo compressor superconducting motor stage assembly 80, turbo compressor superconducting motor stage power conversion system 81, superconducting turbine generator stage assembly 82, superconducting turbine generator stage power conversion system 83, electrical protection system 84, overall control and monitoring system 85, intermediate power storage system 86, propulsion superconducting motor assembly 87, propulsion superconducting motor assembly power conversion system 88, and auxiliary energy storage system 89 configuration, as illustrated, including the respective operable interconnections.

It will be obvious to those recently skilled in the art that modifications to the apparatus up and process disclosed here in may occur, including substitution of various component values or nodes of connection, without parting from the true spirit and scope of the disclosure.

What is claimed is:

1. A superconducting generator turbine apparatus comprising:
   a plurality of counter rotating bypass fans positioned in a hollow-core shaftless frame,
   a fully segmented electric compressor,
   an annular ion-plasma combustor with electromagnetic electrodes, and
   a multi-stage superconducting counter-rotating turbine power generator capable of developing at least 2.0 MW per stage.

2. A superconducting generator turbine apparatus comprising:
   (A) a generally cylindrical frame having an interior surface, a center and containing a fully segmented electric compressor,
   (B) a plurality of counter rotating bypass fans,
   (C) a turbine disposed within the cylindrical frame and configured to generate electrical power, the turbine comprising:
      i) at least one arcuate blade array movably coupled relative to the interior surface of the generally cylindrical frame, and
      ii) a plurality of induction coils disposed about a perimeter of the generally cylindrical frame, and
   (D) an annular ion-plasma combustor configured to generate plasma exhaust comprising ionized molecules of a first polarity,
      wherein a hollow-core shaftless bypass air flow tunnel is disposed at the center of the generally cylindrical frame and extends from the plurality of counter rotating bypass fans through the turbine, the fully segmented electric compressor the combustor and an exhaust nozzle.

* * * * *